United States Patent
Dearborn et al.

(10) Patent No.: US 12,534,991 B2
(45) Date of Patent: Jan. 27, 2026

(54) HIGH PRESSURE ABRASIVE FLUID INJECTION

(71) Applicant: TD Tools, Inc., Woodburn, KY (US)

(72) Inventors: Earl H. Dearborn, Woodburn, KY (US); Thomas L. Dotson, Woodburn, KY (US); John M. Piercy, Woodburn, KY (US); Henry Wohltjen, Bowling Green, KY (US)

(73) Assignee: TD Tools, Inc., Woodburn, KY (US)

( * ) Notice: Subject to any disclaimer, the term of this patent is extended or adjusted under 35 U.S.C. 154(b) by 0 days.

(21) Appl. No.: 18/083,250

(22) Filed: Dec. 16, 2022

(65) Prior Publication Data

US 2023/0193733 A1    Jun. 22, 2023

Related U.S. Application Data (60) Provisional application No. 63/265,757, filed on Dec. 20, 2021.

(51) Int. Cl.
  *E21B 43/26*   (2006.01)
  *E21B 43/25*   (2006.01)
  *G05D 7/06*    (2006.01)

(52) U.S. Cl.
  CPC ....... *E21B 43/2607* (2020.05); *G05D 7/0623* (2013.01)

(58) Field of Classification Search
  CPC .... E21B 43/2607; E21B 43/114; E21B 43/25; E21B 7/065; E21B 7/18; G05D 7/0623
  USPC ...................................................... 166/308.1
  See application file for complete search history.

(56) References Cited

U.S. PATENT DOCUMENTS

| | | | |
|---|---|---|---|
| 8,925,653 B2* | 1/2015 | Dotson | E21B 43/114 166/222 |
| 9,291,038 B2* | 3/2016 | Dotson | E21B 43/114 |
| 10,550,665 B1* | 2/2020 | Golden | F16K 31/041 |
| 10,747,240 B1* | 8/2020 | Surjaatmadja | F04B 23/04 |
| 2012/0217011 A1* | 8/2012 | Dotson | E21B 43/114 166/305.1 |
| 2014/0048158 A1* | 2/2014 | Baca | E21B 33/068 137/511 |
| 2015/0007651 A1* | 1/2015 | Reyes, III | G01N 29/227 73/152.51 |
| 2015/0083424 A1* | 3/2015 | Dotson | E21B 43/114 166/55 |

(Continued)

*Primary Examiner* — Nicole Coy
*Assistant Examiner* — Douglas S Wood
(74) *Attorney, Agent, or Firm* — Norton Rose Fulbright US LLP (57) ABSTRACT

The present disclosure includes an injection system for providing abrasive slurry output density in a system. In some aspects, the injection system can include a first vessel configured to receive a fluid from a high-pressure pump, a plurality of valves in selective communication with the first vessel, and a controller in communication with the plurality of valves. The controller can be configured to actuate the plurality of valves between a first state, in which a slurry is delivered to the first vessel and a second state in which the slurry is delivered from the first vessel. In some configurations, the controller may actuate the valves from the second state to the first state when an amount of slurry is less than a first threshold, and actuate the valves from the first state to the second state when the amount of slurry is greater than a second threshold.

20 Claims, 6 Drawing Sheets

(56) References Cited

U.S. PATENT DOCUMENTS

| | | | |
|---|---|---|---|
| 2015/0084044 A1* | 3/2015 | Tanaka | H10D 64/691 |
| | | | 257/43 |
| 2016/0084044 A1* | 3/2016 | Shen | E21B 43/267 |
| | | | 166/280.1 |
| 2019/0218899 A1* | 7/2019 | Keilers | E21B 43/2607 |
| 2021/0324718 A1* | 10/2021 | Anders | E21B 43/26 |
| 2021/0325718 A1* | 10/2021 | Li | G02F 1/133514 |
| 2022/0205890 A1* | 6/2022 | Chen | G01K 1/14 |

* cited by examiner

HIGH PRESSURE ABRASIVE FLUID INJECTION

CROSS-REFERENCE TO RELATED APPLICATION

This application claims the benefit of U.S. Provisional Patent Application No. 63/265,757, filed Dec. 20, 2021, which is incorporated by reference herein in its entirety.

FIELD OF INVENTION

The present invention relates generally to an abrasive fluid injection system, and more specifically, to a systems and methods for abrasive jet perforation or slurry injection for hydraulic fracturing in oil and gas wells.

BACKGROUND

Abrasive fluids are used for a variety of industrial applications, particularly in the oil and gas field. For example, in hydraulic fracturing, a fluid mixed with abrasive materials (e.g., proppant, sand, etc.) is pumped into a wellbore at high pressure to fracture the rock foundation. The amount of abrasive material mixed with the fluid can be an important criteria for a successful frac job. Traditionally, a polymer or gel is added to the carrier fluid (usually water) and then the abrasive is either mixed in batch or added "on the fly" through a mechanical feeder into the fluid stream at high volume, but low pressure. The low pressure allows techniques like Venturi mixers (i.e., mud mixers, water jet eductors) to be used to incorporate the abrasive into the fluid. These techniques do not work for mixing at high pressures produced by today's frac pumps that operate from 2,000 psi to 15,000 psi. After the slurry is mixed at low pressure, it is then fed to the abrasive high-pressure pump unit. These pumps have valves, plungers and other parts that are made to withstand the eroding action of the abrasive fluid at high pressure. These internal pump parts are eroded by the flow of sand and must be replaced so frequently that redundant pump units are required on the well location anticipating a pump failure. The fluid slurry is then pumped at high pressure downhole to create the hydraulic fracture or perforate through the SJP tool.

Current systems utilized a timed cycle to achieve a target fluid density, or ratio of fluid to abrasive material. For example, U.S. Pat. Nos. 9,291,038 and 8,925,653 utilize pressure vessels that are filled with abrasive (sand) slurry at atmospheric pressure and have the abrasive displaced from the vessels using high pressure clear fluid. These systems utilize a timed cycle to actuate valves to change the flow of the system regardless of fluid flow. Multiple timed cycles may be selected for use, but changes in flow will change the density of the output slurry.

Other industries, such as high pressure water blasting, that use abrasives on the surface with high pressure for cleaning and cutting currently add the abrasive in front of the fluid stream. This process keeps the abrasive from contact with the high pressure equipment, however the abrasive is not as effective in this scenario as when the sand is entrained in the fluid. The sand particles do not have time to reach full velocity before they encounter the target material.

SUMMARY

The present disclosure provides improvements to the high pressure abrasive pumping process that allows for improved performance and more cost effective operation by removing the sand from the flow through the pump by incorporating the sand into the fluid stream on the high pressure line. The present system can provide a precise output fluid density as well as the ability to vary the flow rate through the system during operation. In some systems or methods of the present disclosure, the abrasive material is mixed based on the amount of abrasive material in the system and is independent of a timing cycle.

In some aspects, the present disclosure provides an injection system having a first vessel configured to receive a fluid from a high-pressure pump, a plurality of valves (each operable between a closed state and an open state), and a controller in communication with the plurality of valves. In some aspects, the controller is configured to: actuate the plurality of valves between a first state, in which a slurry (including particulate solids) is delivered to the first vessel and a second state in which the slurry is delivered from the first vessel. In some aspects the controller may determine an amount of slurry within the first vessel, actuate the plurality of valves from the second state to the first state when the amount of slurry is less than a first threshold, and actuate the plurality of valves from the first state to the second state when the amount of slurry is greater than a second threshold.

In some aspects, the present system can include an ultrasonic transducer coupled to the first vessel and in communication with the controller. In some such configurations, the controller can be configured to determine the amount of slurry within the first vessel based on a first input from the ultrasonic transducer. Additionally, or alternatively, the controller can be configured to control an output of the slurry from the first vessel such that a density of the slurry is maintained as the slurry is delivered from the first vessel. In some of the described systems, the controller can be configured to actuate the valves between the first state and the second state, independent of a time period, to provide the slurry to a wellbore at a target density, determine an output fluid density from the first vessel to the wellbore, and operate the valves between the first and second states to maintain the output fluid density at the target density, actuate the valves between the first state and the second state, such that non-abrasive fluid is not delivered from the first vessel to the wellbore, or combination thereof.

In some aspects, the system can include a second vessel that can receive fluid from the first vessel, receive particulate solids from a hopper, mix the fluid and the particulate solids to form the slurry, deliver the slurry to the first vessel, or combination thereof. In some such configurations, the controller is configured to switch the valves from the first state to the second state based on a flow rate of the slurry from the second vessel to the first vessel. The second vessel can be in fluid communication with the first vessel while the plurality of valves is in the first state. In some configurations, the second vessel is not in fluid communication with the first vessel while the plurality of valves is in the second state.

Some of the present systems may include a low-pressure pump configured to deliver slurry from the second vessel to the first vessel via a first inlet of the first vessel and the high-pressure pump configured to deliver non-abrasive fluid to the first vessel via a second inlet of the first vessel. In some configurations, the high-pressure pump is in fluid communication with the first vessel while the plurality of valves are in the second state. In some configurations, the high-pressure pump is not in fluid communication with the first vessel while the plurality of valves are in the first state.

The first vessel may include a first outlet configured to deliver fluid from the first vessel to the second vessel and a second outlet configured to deliver fluid from the first vessel to a wellbore. In some of the disclosed systems, the plurality of valves include, a first valve coupled to the first inlet of the first vessel and configured to selectively permit flow from the second vessel to the first vessel, a second valve coupled to the first outlet of the first vessel and configured to selectively permit flow from the first vessel to the second vessel, a third valve coupled to the second inlet of the first vessel and configured to selectively permit flow from the high-pressure pump to the first vessel, a fourth valve coupled to the second outlet of the first vessel and configured to selectively permit flow from the first vessel to the wellbore, or combination thereof. In some aspects, the system can include a bypass line configured to deliver fluid from the high-pressure pump to the wellbore. The bypass line can include a bypass valve configured to selectively permit flow from the high-pressure pump to the wellbore. In some configurations, the system can include a first tee fitting coupled to a first port of the first vessel, the first tee fitting including the first inlet and the second inlet of the first vessel, a second tee fitting coupled to a second port of the first vessel, the second tee fitting including the first outlet and the second outlet of the first vessel, or both.

In some aspects of the present system, while the plurality of valves is in the first state, the first valve, the second valve, and the bypass valve in the open state and the third valve and the fourth valve are in the closed state. In some such configuration, the system can define a first flow path from the second vessel, through the first valve, through the first vessel, through the second valve, and to the second vessel, the first flow path being a closed loop flow path and a second flow path from the high-pressure pump, through the bypass valve, through the bypass line, and to the wellbore. In some aspects of the present system, while the plurality of valves is in the second state, the first valve, the second valve, and the bypass valve in the closed state and the third valve and the fourth valve are in the open state. In some such configuration, the system can define a third flow path from the high-pressure pump, through the third valve, through the first vessel, through the fourth valve, and to the wellbore. In some configurations, when the slurry is delivered to the well bore via a portion of the third flow path, the particulate solids and the fluid of the slurry have a velocity that is within 15% of one another.

In some aspects, the system can include a third vessel. The third vessel may include a first inlet configured to receive fluid from the high pressure, a second inlet configured to receive slurry from the second vessel, a first outlet configured to deliver fluid from the third vessel to the wellbore, a second outlet configured to deliver fluid from the third vessel to the second vessel, or combination thereof. In some configurations, fluid or slurry is delivered from the third vessel to the wellbore when the plurality of valves is in the first state and slurry is delivered from the second vessel to the third vessel when the plurality of valves is in the second state. In some of the described configurations, the system can include a fifth valve coupled to the first inlet of the third vessel and configured to selectively permit flow from the high-pressure pump to the third vessel, a sixth valve coupled to the first outlet of the third vessel and configured to selectively permit flow from the third vessel to the wellbore, a seventh valve coupled to the second inlet of the third vessel and configured to selectively permit flow from the second vessel to the third vessel, an eighth valve coupled to the second outlet of the third vessel and configured to selectively permit flow from the third vessel to the second vessel, or combination thereof. In some configurations, while the plurality of valves are in the first state: the first valve, the second valve, the fifth valve, and the sixth valve are in the open state and the third valve, the fourth valve, the seventh valve, and the eighth valve are in the closed state.

Some aspects can include methods for injecting an abrasive fluid. Some such methods can include operating an injection system between a first operating cycle and a second operating cycle. The first operating cycle can include delivering a slurry to a first vessel at a first pressure below a pressure threshold, delivering a non-abrasive fluid from a high-pressure pump to a foundation at a second pressure above the pressure threshold, or both. In some configurations, the second operating cycle can include delivering the slurry from the first vessel to the foundation at a third pressure above the pressure threshold. In some aspects, the method may include comparing an amount of slurry in the first vessel to a maximum slurry threshold and operating the injection system in the second operating cycle when the amount of slurry is greater than the maximum slurry threshold.

Some methods may include mixing particulate solids with a fluid to form the slurry, comparing the amount of slurry in the first vessel to a minimum slurry threshold, and operating the injection system in the first operating cycle when the amount of slurry is less than the minimum slurry threshold. In some such configurations, comparing the amount of slurry can include determining, via an ultrasonic transducer, the amount of slurry in the first vessel. In some of the present methods, the injection system switches from the first operating cycle to the second operating cycle when the amount of slurry is greater than the maximum slurry threshold, and the injection system switches from the second operating cycle to the first operating cycle when the amount of slurry is less than the minimum slurry threshold. In some configurations, the injection system switches between the first operating cycle and the second operating cycle independent of a time period.

Applications for the invention include, but are not limited to, abrasive slurry injection for hydraulic fracturing in oil and gas wells, but it can also be used in abrasive jet perforating and other oilfield related work that uses high pressure fluids that contain abrasive material (e.g., cementing, gravel packing, and chemical injection) and also in the high-pressure cleaning industry and numerous other industrial applications. Aspects of the invention may provide accurate and consistent abrasive slurry output density during varying flow rates in an abrasive fluid injection system by measuring the fill level of the slurry in the pressure vessel among other things. The level of sand slurry (measured through the location of the sand slurry/clear fluid interface) can be monitored using ultrasonic transducers as the slurry is pumped into and out of a pressure vessel.

Aspects of the invention may be used as a more efficient and cost effective way to incorporate abrasive fluid or slurry into a high pressure fluid stream, which can reduce maintenance costs associated with pumping abrasive slurries at high pressure and flow. Aspects may be used in large (1,000-6,000 horsepower) fracturing pumps or cementing pumps are used to pump the sand laden fluid for both hydraulic fracturing operations and to the sand jet perforating (SJP) tools. Aspects of this invention may provide improvements to the high-pressure abrasive pumping process that allows for improved performance and more cost effective operation by removing the sand from the flow through the pump by incorporating the sand into the fluid stream on the high pressure line. In some configurations, the use of pressure vessels and cycles, along with slurry flow monitoring, may avoid the feeding of dry sand into the top of a pressure vessel when it is in the low pressure part of a cycle and performing pressure equalization using a pressure multiplier device (like a hydraulic cylinder to compress the fluid) so that the pressure in the vessel is greater than the pressure in the line creating a pressure differential that causes the fluid in the vessel to flow into a line. That is, the valves in a system, according to aspects of this disclosure, may not be controlled based on pressure differentials for cycle activation. Another benefit is that the system can self-adjust to changes in flow rate. If the pump flow decreases, the vessel will take longer to empty and the cycle time will naturally be longer. If flow rate increases, the vessel will empty more quickly, shortening the overall cycle time. This invention automatically adjusts for flow, which is important in some applications.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" or "approximately" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent. Further, an apparatus or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps. Unless otherwise noted, the term "fluid," as used herein, encompasses solid-liquid mixtures, such as slurries.

Any configuration of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one configuration may be applied to other configurations, even though not described or illustrated, unless expressly prohibited by this disclosure or the nature of the configurations.

Some details associated with the configurations described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

DETAILED DESCRIPTION

Figure 1:
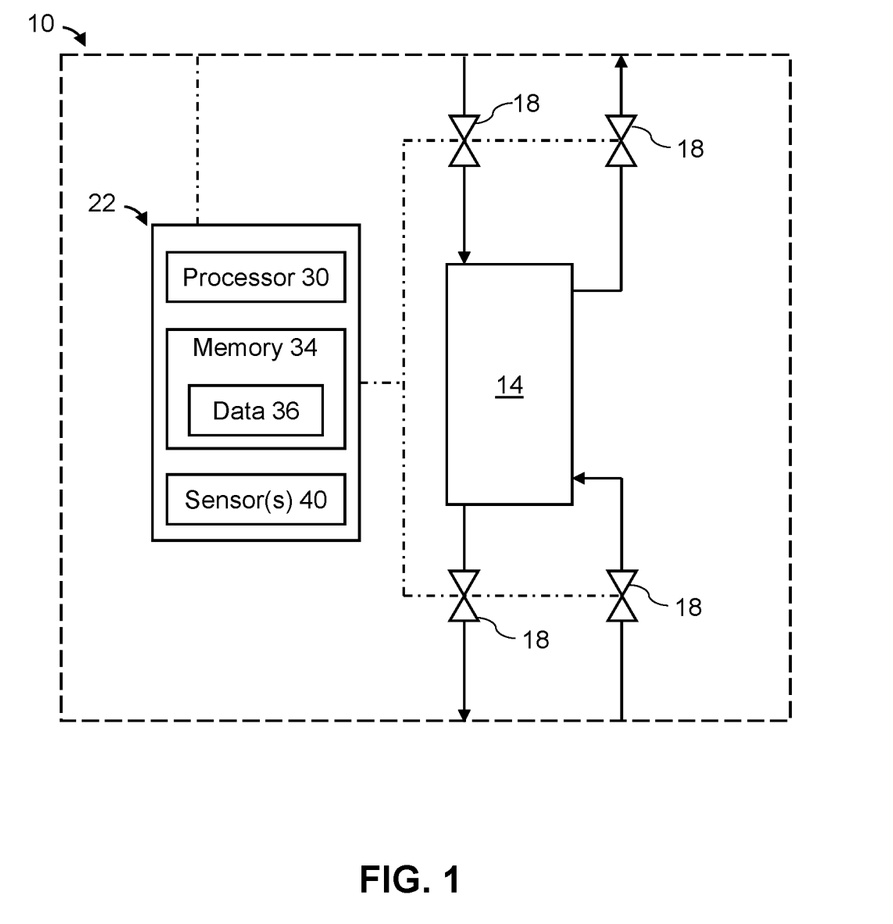
FIG. 1 is a schematic block diagram of an example of an injection system of some embodiments of the present disclosure.

Referring to FIG. 1, an injection system 10 is shown for mixing an abrasive material with a carrier fluid. As shown, system 10 includes a first vessel 14 having a plurality of ports (e.g., inlets or outlets) configured to communicate fluid between the first vessel 14 and other components. System 10 includes a plurality of valves 18 associated with the ports of first vessel and a controller 22 in communication with the valves to control the flow of fluid through first vessel 14. System 10 can provide improved delivery of an abrasive fluid or slurry to a target location (e.g., 26), such as a wellbore. In some aspects, system 10 can provide a precise output fluid density as well as the ability to quickly vary the flow rate or density of the fluid output.

First vessel 14 may be a high pressure vessel configured to store fluid at pressures above 2,000 pounds per square inch (psi) (e.g., at or above 5,000, 8,000, 10,000, 12,000, or 15,000 psi). In some configurations, first vessel 14 can include or define multiple inlets configured to receive fluid from an external source. Additionally, or alternatively, first vessel 14 can include or define multiple outlets configured to deliver fluid from the first vessel to an external source. As depicted in FIG. 1, first vessel can include high-pressure ports (e.g., inlet and outlet) and low-pressure ports. As described herein, high-pressure ports can be configured to communicate fluid at a high pressure (e.g., above 5,000 psi) and the low-pressure ports can be configured to communicate fluid at a lower pressure (e.g., less than 1,000 psi). In some such configurations, the high-pressure ports can be configured to only communicate clear fluid (i.e., fluid without particulate solids) and the low can be configured to communicate solid-liquid mixtures (i.e., slurry) to first vessel 14. Although first vessel 14 is shown with two inlets and two outlets, more or less ports can be included. As a non-limiting example, first vessel 14 can have a single inlet and outlet and the incoming or outgoing flow may be joined together at a tee-junction prior to connecting to the vessel.

Each valve 18 is configured to be operable between a closed state, in which the valve blocks fluid flow, and an open state, in which fluid may pass through the valve. Valves 18 may include any suitable valve-type as is known in the art, including plug valves, gate valves, screw valves, poppet valves, check valves, or the like. At least some of the valves 18 are in communication with one or more ports of first vessel 14 and can be actuated to control the flow of fluid through the first vessel, as described herein.

As shown in FIG. 1, controller 22 includes a processor 30, a memory 34, and one or more sensor(s) 40 (e.g., a pressure sensor, flowmeter, density sensor, depth sensor, ultrasonic transducer, or the like). The illustration of controller 22 is illustrative and, in other implementations, the controller described herein may not include all of the components shown in FIG. 1 or may include additional components, such as wireless interface(s), an input/output (I/O) device, or other circuitry or network components. Processor 30 may be a central processing unit (CPU) or other computing circuitry (e.g., a microcontroller, one or more application specific integrated circuits (ASICs), and the like) and may have one or more processing cores. Memory 34 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 34 may store instructions that, when executed by processor 30, cause the processor to perform the operations described herein. Additionally, or alternatively, memory 34 may be configured to store data 36 associated with system 10. Such data 36 can include one or more measurements transmitted by sensors 40, one or more thresholds, other historical or predictive data, or combination thereof. Sensors 40 may include one or multiple (e.g., more than two) sensors of the same type (e.g., multiple ultrasonic transducers), sensors of different types (e.g., ultrasonic transducer and a flowmeter), or both. At least one of sensors 40 is configured to measure an amount of slurry within first vessel 14. Although shown within controller 22, sensors 40 can be coupled to or integral with other components of system 10 (e.g., first vessel 14) or external components.

Controller 22 can be in communication with valves 18 and may collectively control the valves to adjust the fluid flow of the system between various operational states. For example, controller 22 can be configured to adjust valves 18 to change the flow of fluid through system 10 between a first state, in which a slurry is delivered to first vessel 14 and a second state in which the slurry is delivered from the first vessel. To further illustrate, the controller 22 can operate valves to a first state in which a slurry to first vessel 14 at a pressure below a pressure threshold. The controller 22 may actuate valves 18 to be in a second state in which the slurry is delivered from first vessel 14 at a pressure above the pressure threshold. In some configurations, controller 22 is configured to switch between the first and second states based on an amount of slurry in first vessel 14 (e.g., operating the injection system in the second state when the amount of slurry is greater than a maximum slurry threshold).

Figure 2A:
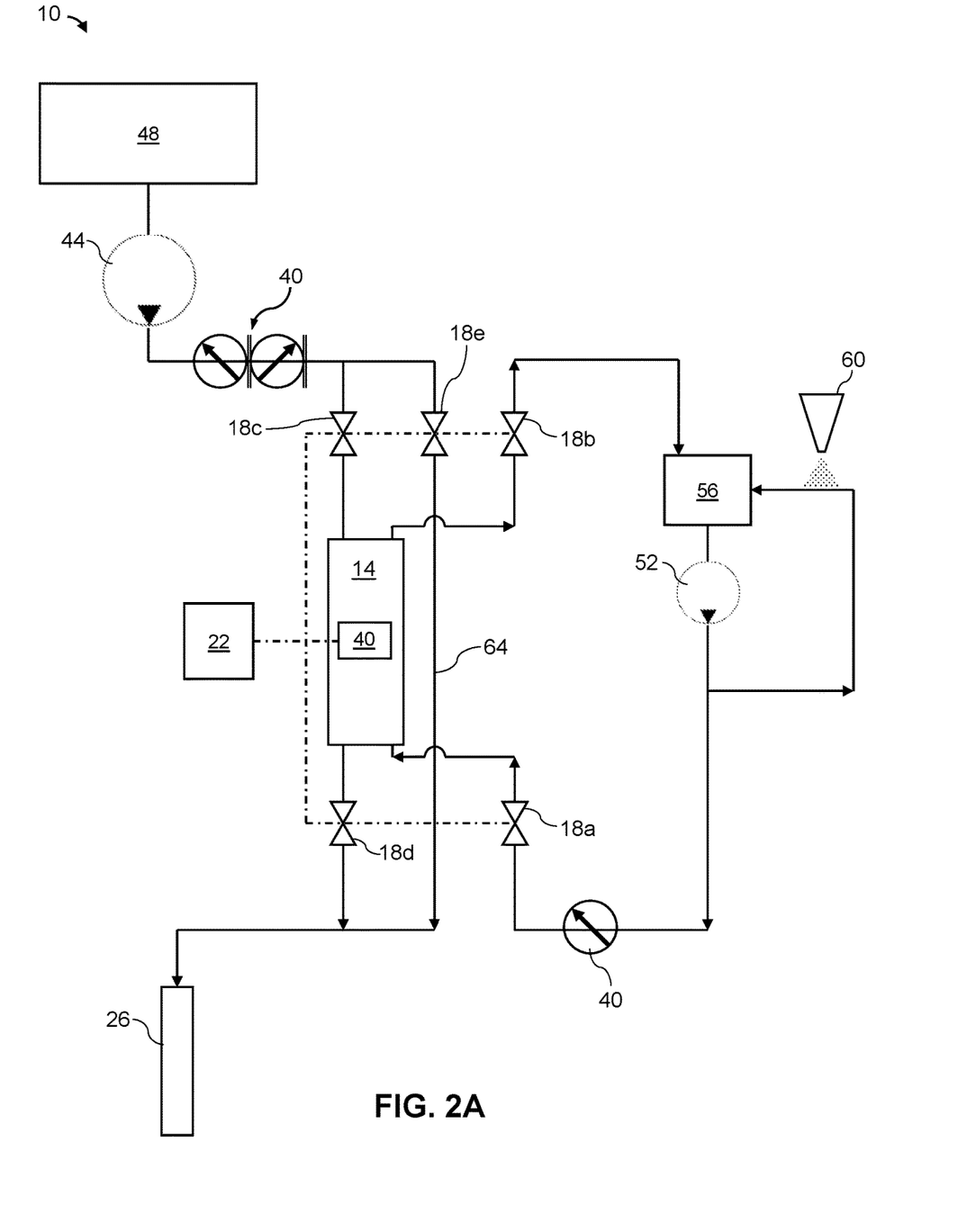
FIG. 2A is a schematic block diagram of another example of an injection system of some embodiments of the present disclosure.

Referring now to FIG. 2A, shown is a second example of system 10 including first vessel 14, valves 18, and controller 22 operating to deliver abrasive fluid to a target location 26. System 10 can include a plurality of sensors 40 to measure the pressure, flow rate, density, weight, mass, volume, or the like. For example, one sensor 40 (e.g., ultrasonic transducer) can be coupled to first vessel 14 to monitor a level of slurry in the first vessel. As depicted, system 10 may include a high-pressure sub-system configured to supply high-pressure fluid to first vessel 14 and low-pressure sub-system may be configured to provide low-pressure fluid to the first vessel. In some configurations, high-pressure sub-system can include a high-pressure pump 44 in communication with a fluid reservoir 48. In some configurations, high-pressure sub-system can include a bypass line 64 that connects high-pressure pump 44 and target location 26 without passing through first vessel 14. In some configurations, low-pressure sub-system can include a low-pressure pump 52 in communication with a mixing tank 56 (e.g., second vessel).

High-pressure pump 44 may be configured to pump fluids to first vessel 14, target location 26, or both. Depending on the application, pump 44 can be configured to pump fluids at pressures above 5,000 psi. For example, in hydraulic fracturing, pump 44 may be a positive displacement frac pump operating above 10,000 psi. In other examples, system 10 can be used for jet perforating or water blasting and pump 44 can be configured to pump fluid at higher pressures (e.g., up to or above 50,000 psi). One or more sensors 40 (e.g., pressure transducer, flowmeter, etc.) can be placed downstream of pump 44 to measure a flow rate or pressure of the fluid. For simplicity only a single pump (e.g., 44) and reservoir 48 are shown, but it should be understood that other configurations may include additionally pumps, reservoirs, or other components (e.g., manifold, missile, etc.) as is known in the art. Pump 44 and fluid reservoir 48 are configured to operate with clear fluid, without abrasive media. In this way, pump 44 may be isolated from abrasive materials or solid particulates that may cause accelerated wear of the pump. This isolation from abrasive materials can be extend the life of pump 44 allowing for increased operational time, less maintenance, and decreased costs compared to traditional abrasive pumping systems.

Low-pressure pump 52 is configured to operate at pressure lower than high-pressure pump 44. For example, pump 52 may operate at pressures below 2,000 psi and, preferably lower than 1,000, 750, 500, 250, or 200 psi. Pump 52 may receive a slurry from mixing tank 56 or assist with mixing of the slurry. In some configurations, system 10 may, but need not, include a hopper 60 configured to deliver solid particulate (e.g., sand, silica, proppant, or the like) into mixing tank 56. For example, pump 52 and mixing tank 56 are configured to receive fluid (e.g., from first vessel 14 or external source), receive particulate solids (e.g., from hopper 60), mix the fluid and the solids to form a slurry, and deliver the slurry to first vessel 14. Although not shown, fluid may be delivered to mixing tank 56 from an external source or other component (e.g., 48) of system 10. In some configurations, system 10 need not include a low-pressure sub-system and can be configured to operate with an existing system. For example, in hydraulic fracturing system 10 can be configured to operate with a blender (having its own mixing tanks and pumps) that may be connected to first vessel 14 and in communication with processor 30 to perform the functions described herein.

As shown in FIG. 2A, the plurality of valves 18 can include a first valve 18a coupled to a first inlet of first vessel 14 and configured to selectively permit flow from mixing tank 56 to the first vessel, a second valve 18b coupled to a first outlet of first vessel 14 and configured to selectively permit flow from the first vessel to mixing tank 56, a third valve 18c coupled to a second inlet of first vessel 14 and configured to selectively permit flow from high-pressure pump 44 to the first vessel, a fourth valve 18d coupled to a second outlet of first vessel 14 and configured to selectively permit flow from the first vessel to target location 26, or combination thereof. Some configurations may include a bypass valve 18e coupled to bypass line 64 and configured to selectively permit flow from high-pressure pump 44 to target location 26. In other configurations, system 10 can include more or less valves based on the specific application.

Figure 2B:
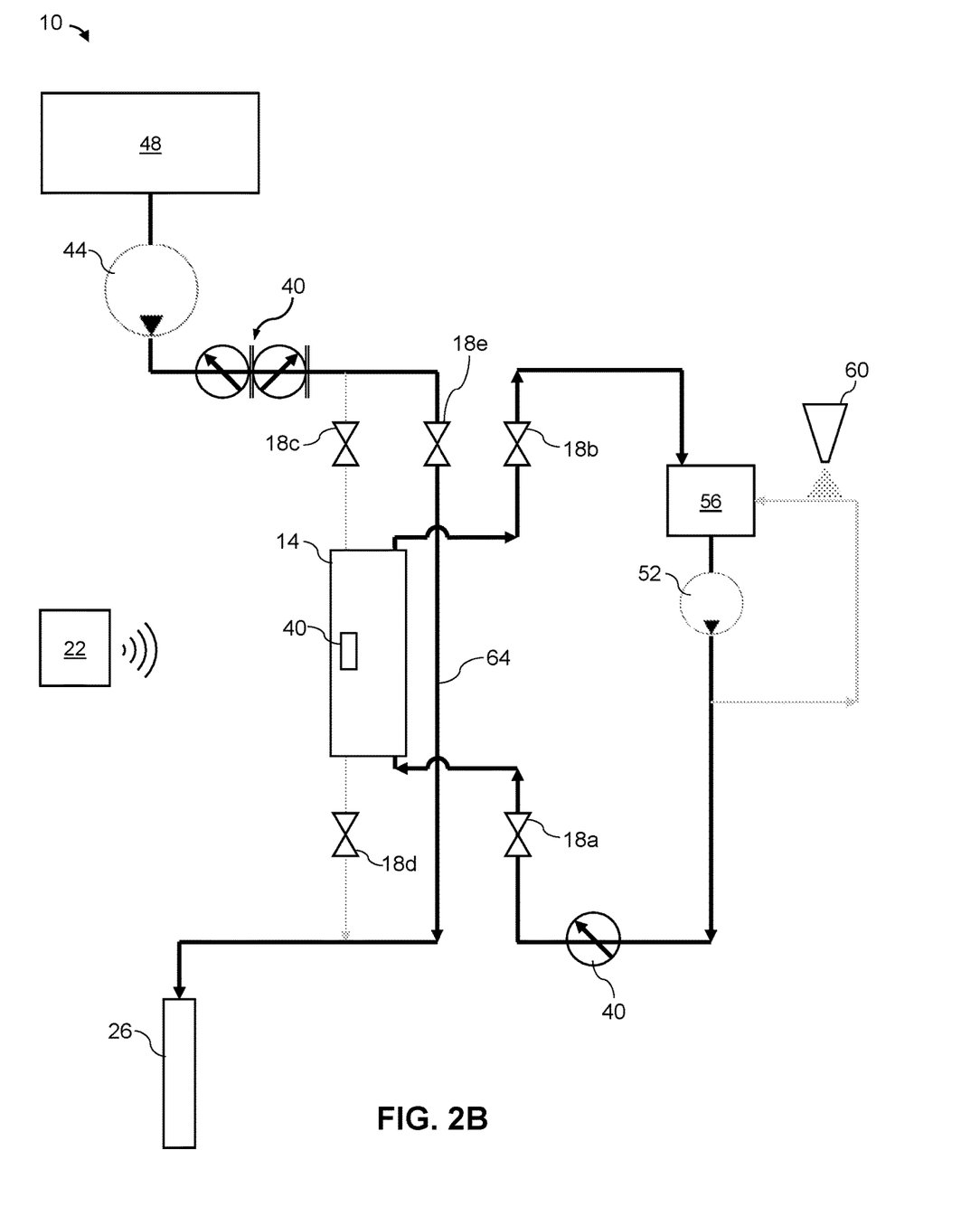
FIG. 2B is a diagram of the injection system of FIG. 2A in a first operational state.
Figure 2C:
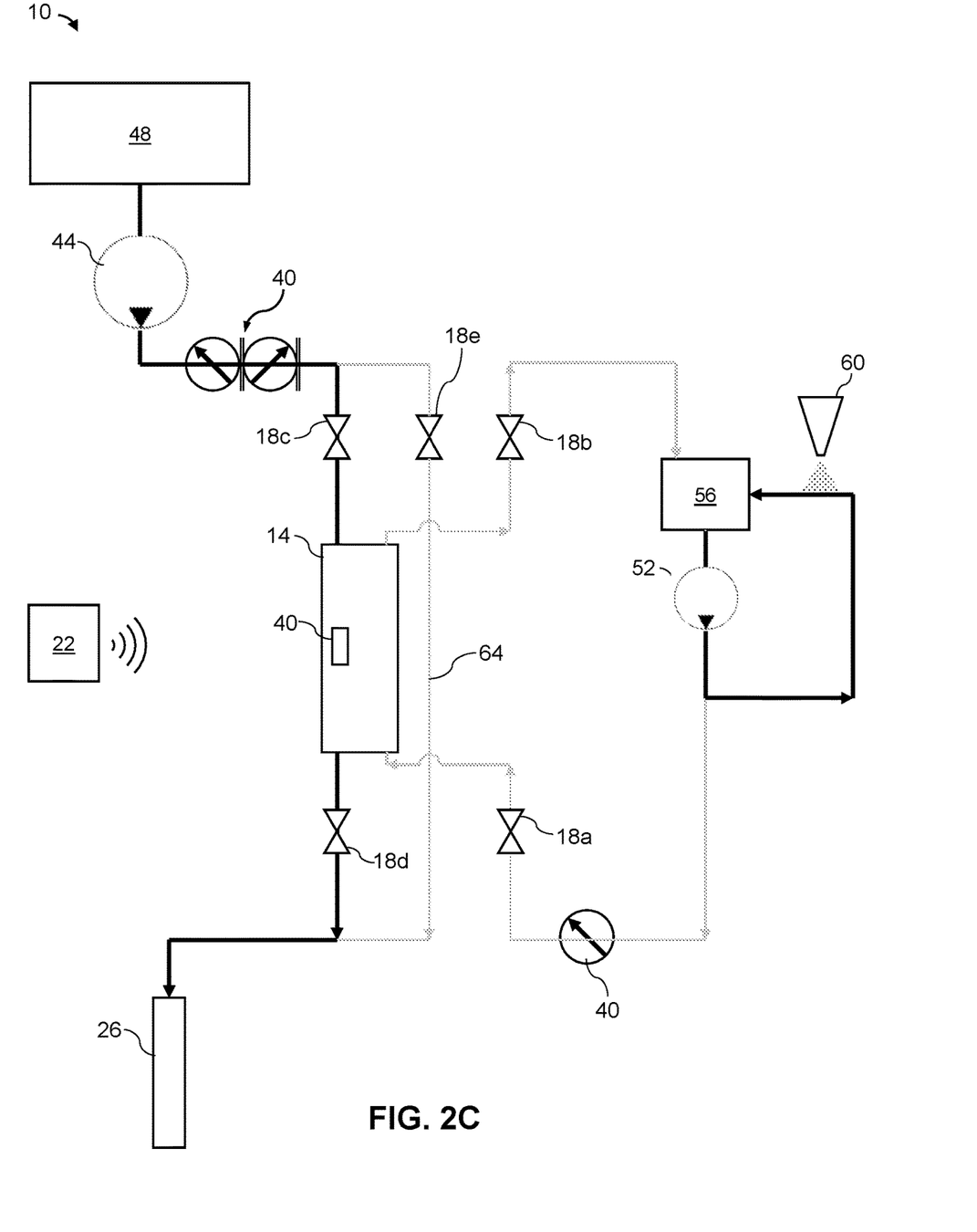
FIG. 2C is a diagram of the injection system of FIG. 2A in a second operational state.

Controller 22 is configured to actuate the valves 18 to define different flow paths within system 10. Referring now to FIGS. 2B and 2C, controller 22 is shown operating the valves in a first operating state and second operating state, respectively.

In the first operational state (FIG. 2B), low-pressure pump 52 is configured to deliver a slurry to first vessel 14 at a first pressure that is below a pressure threshold (e.g., 36). For example, low-pressure pump 52 is configured to deliver slurry from mixing tank 56 to first vessel 14 via a first inlet of the first vessel. In some configurations, while system 10 is in the first operational state, high-pressure pump 44 is configured to deliver a clear fluid to target location 26 at a second pressure that is above the pressure threshold. While in the first operational state, controller 22 is configured to operate valves 18 to define a first flow path from: mixing tank 56, through first valve 18a, to first vessel 14. In some configurations, first flow path may further flow, through second valve 18b, and back to mixing tank 56, being a closed loop flow path. In some configurations, controller can actuate valves 18 to define a second flow path in system 10, from: high-pressure pump 44, through bypass valve 18e, through bypass line 64, and to target location 26. In such configurations, high-pressure pump 44 is not in fluid communication with first vessel 14 while the plurality of valves 18 are in the first state. As depicted in FIG. 2B, controller 22 is configured to operate first valve 18a, second valve 18b, and bypass valve 18e in the open state and operate third valve 18c and fourth valve 18d in the closed state.

Referring now to FIG. 2C, a second operational state is shown in which slurry is delivered from first vessel 14 to target location 26. In some configurations, controller 22 is configured to operate in the second operational state subsequent to the first operational state so that slurry delivered to first vessel 14 in the first operational state is delivered to target location 26 in the second operational state. While in the second operational state, controller 22 is configured to operate valves 18 to define a third flow path from high-pressure pump 44, through third valve 18c, through first vessel 14, through fourth valve 18d, and to target location 26. Thus, high-pressure pump 44 is in fluid communication with first vessel 14 while the plurality of valves 18 are in the second state. In the second operational state, controller 22 is configured to operate first valve 18a, second valve 18b, and bypass valve 18e in the closed state and operate third valve 18c and fourth valve 18d in the open state. As depicted in FIG. 2C, mixing tank 56 and low-pressure pump 52 may not be in fluid communication with first vessel 14 while the plurality of valves 18 are in the second state. System 10 can define a recirculation line that is configured to mix solid particulate (e.g., from hopper 60) and fluid for subsequent delivery to first vessel 14.

In some aspects, controller 22 is configured to actuate the valves 18 between the first and second states to deliver slurry to target location 26. In some configurations, controller 22 is configured to switch the valves from the first state to the second state based on a flow rate of the slurry from mixing tank 56 to first vessel 14. To illustrate, controller 22 can be configured to determine an amount of slurry within first vessel 14, actuate the plurality of valves from the second state to the first state when the amount of slurry is less than a first threshold (e.g., minimum fill threshold), and actuate the plurality of valves from the first state to the second state when the amount of slurry is greater than a second threshold (e.g., maximum fill threshold).

In some configurations, controller 22 can determine the amount of slurry in first vessel 14 based on an input from one or more sensors 40 coupled to first vessel 14. For example, in configurations in which an ultrasonic transducer is coupled to first vessel, the interference caused by the solid particulate (e.g., sand) in the slurry can be utilized (e.g., by controller 22 or an operator) to determine the level of slurry in the first vessel. To further illustrate, first vessel 14 can be filled with clear fluid which provides a strong signal (e.g., minimum slurry threshold) for ultrasonic transducer and a flowmeter can be utilized to calculate the flowrate from the strong signal. As first vessel 14 is filled with slurry, the signal for the ultrasonic transducer diminishes due to the change in fluid characteristics (density, sand disrupting the sound waves, etc.). Once the ultrasonic transducer signal is below a threshold or lost completely, controller 22 can utilize this signal loss, along with other factors, to determine when first vessel 14 is full of slurry. In a non-limiting, simple example, the ultrasonic transducer can be mounted in the middle of the vessel and slurry introduced from one side at a specific flow rate. Once the transducer signal is below the threshold or lost, (e.g., at 5 seconds), then the vessel can be assumed half-full and the time for the vessel to be filled with slurry can be calculated (e.g., at 10 seconds). The same method can be used when emptying the vessel, except that the transducer signal would get stronger, not weaker. Of course, multiple transducers could be employed and other parameters considered to accurately determine when the vessel is full or empty of slurry. In some such configurations, controller 22 can actuate the valves between the first state and the second state, independent of a time period, and based on actual fluid parameters of system 10. In this way and others, system 10 can provide a greater control of slurry properties (e.g., density) than traditional timed systems.

In some configurations, system 10 can provide the slurry to target location 26 at a target density. To illustrate, controller 22 can determine an output fluid density from first vessel 14 to target location 26, and operate valves 18 between the first and second states to maintain the output fluid density at the target density (e.g., density of delivered slurry is within 5% of target density, preferably within 3% or 1% of target density). Additionally, or alternatively, system 10 can operate to deliver slurry where solids are more entrained within the fluid as compared to conventional systems in which the solids are added immediately before reaching the target destination. For example, when the slurry is delivered to target location via first vessel 14, the particulate solids and the fluid of the slurry have a velocity that is within 15% of one another and, preferably within 10%, 5%, or 3% of one another.

Figure 3:
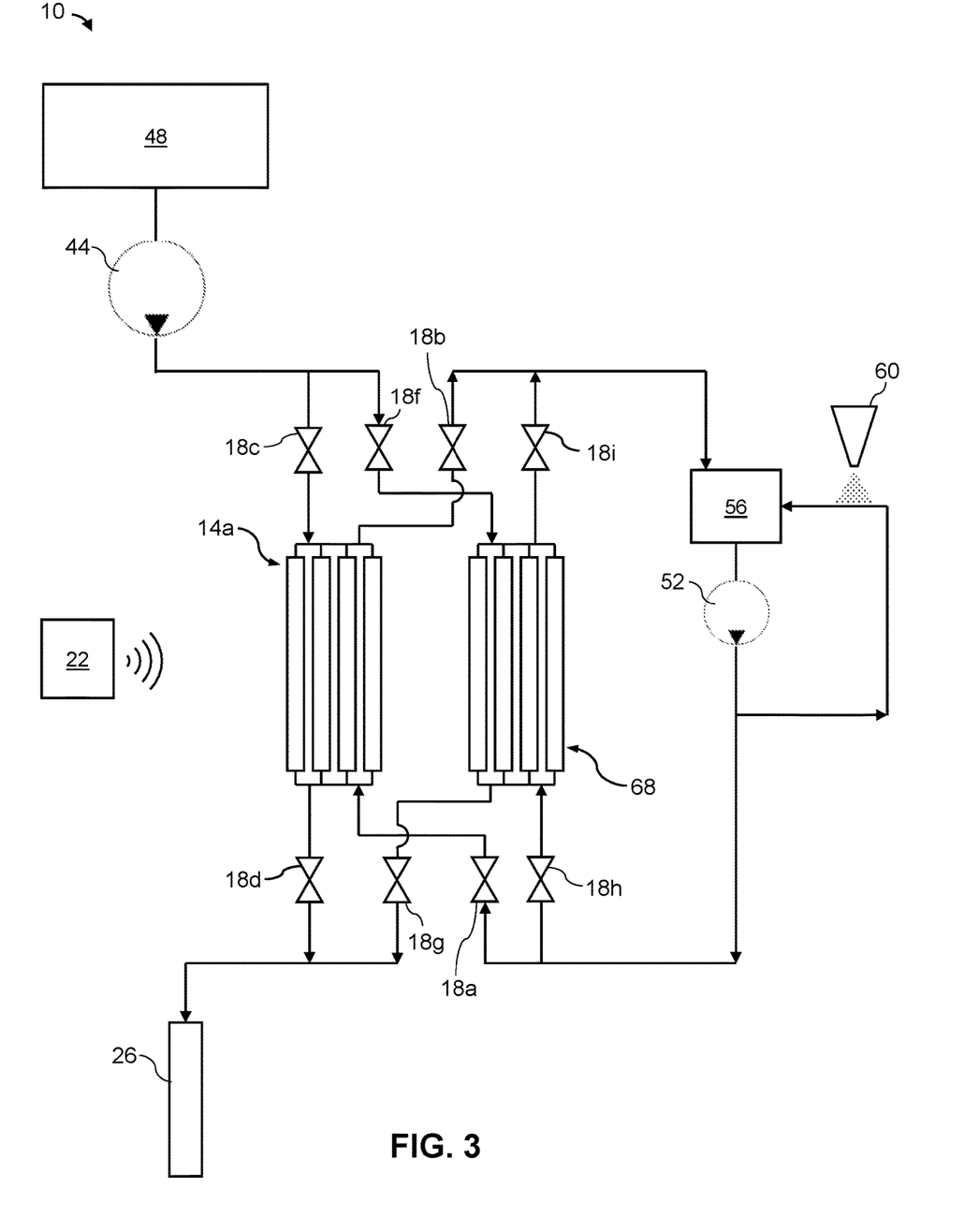
FIG. 3 is a schematic block diagram of a third example of an injection system of some embodiments of the present disclosure.

Referring now to FIG. 3, a second example of system 10 is shown. In these configurations, components that are similar, such as in structure or function, to components discussed with reference to FIGS. 1 and 2A-2C are labeled with the same reference numerals and a new numeral suffix, for example "a." Although not shown in FIG. 3, system 10 can include one or more other components as depicted in FIGS. 1 and 2A-2C, such as sensors 40 (e.g., electric transducer coupled to each vessel), bypass line 64, bypass valve 18e, or the like.

As depicted in FIG. 3, System 10 includes a first vessel 14a and a third vessel 68, each in fluid communication with high-pressure pump 44 and low-pressure pump 52. As depicted first vessel 14a and third vessel 68 each define a plurality of distinct chambers configured to store fluid. At least some of the chambers of first vessel 14a, third vessel 68, or both, can be controllable by a different actuation source (e.g., 44) such that one or the chambers can be discharged independent of one other of the chambers or a single actuation source can control more than one of the chambers to discharge the chambers simultaneously. Where the chambers of first vessel 14*a* or third vessel 68 are independently actuatable, controller 22 can be configured to operate the associated equipment (e.g., valves or motors) to enable the chambers to be filled and emptied at an offset to promote steady pressure and flow of the system. For example, a first chamber can be emptied when a second, preceding chamber is less than a certain threshold (e.g., 75% capacity) and a third, subsequent chamber emptied when the first chamber is less than the threshold or the second chamber is less than a lower threshold (e.g., 50% capacity). In such configurations, one or more sensors (e.g., 40) can be coupled to each chamber to determine the amount of fluid in the chamber. However, in other configurations, first vessel 14*a*, third vessel 68, or both can define a single chamber.

Third vessel 68 may include a first inlet configured to receive fluid from high-pressure pump 44, a second inlet configured to receive slurry from mixing tank 56, a first outlet configured to deliver fluid from the third vessel to target location 26, a second outlet configured to deliver fluid from the third vessel to the mixing tank, or combination thereof. Although described as having first and second inlets/outlets, it should be understood that third vessel 68 can have a single inlet or outlet and a fitting with multiple ports (e.g., tee fitting) that are in communication with a respective component (e.g., valve, pump, vessel, or external source). Third vessel 68 may function similar to first vessel 14, as described above. For example, slurry can be delivered from third vessel 68 to target location 26 when the plurality of valves 18 are in the first state and the slurry can be delivered from mixing tank 56 to the third vessel when the plurality of valves are in the second state. In such configurations, the functions of first vessel 14, 14*a* are opposite of that of third vessel so that one of the vessels can be delivering slurry to target location 26 while the other is being filled with slurry. For example, when high-pressure pump 44 is in fluid communication with first vessel 14*a*, third vessel 68 is in communication with low-pressure pump 52 and vice versa.

As depicted in FIG. 3, third vessel 68 can be connected to a plurality of valves 18 that are controllable by controller 22. In some of the disclosed configurations, system 10 can include a fifth valve 18*f* coupled to the first inlet of third vessel 68 and configured to selectively permit flow from high-pressure pump 44 to the third vessel, a sixth valve 18*g* coupled to the first outlet of third vessel 68 and configured to selectively permit flow from the third vessel to target location 26, a seventh valve 18*h* coupled to the second inlet of the third vessel 68 and configured to selectively permit flow from mixing tank 56 to the third vessel, an eighth valve 18*i* coupled to the second outlet of the third vessel 68 and configured to selectively permit flow from the third vessel to the mixing tank 56, or combination thereof. In some configurations, while the plurality of valves are in the first state: the first valve 18*a*, the second valve 18*b*, the fifth valve 18*f*, and the sixth valve 18*g* are in the open state and the third valve 18*c*, the fourth valve 18*d*, the seventh valve 18*h*, and the eighth valve 18*i* are in the closed state. Alternatively, while the plurality of valves are in the first state, the controller 22 is configured to actuate the valves such that the first valve 18*a*, the second valve 18*b*, the fifth valve 18*f*, and the sixth valve 18*g* are in the closed state and the third valve 18*c*, the fourth valve 18*d*, the seventh valve 18*h*, and the eighth valve 18*i* are in the open state.

Figure 4:
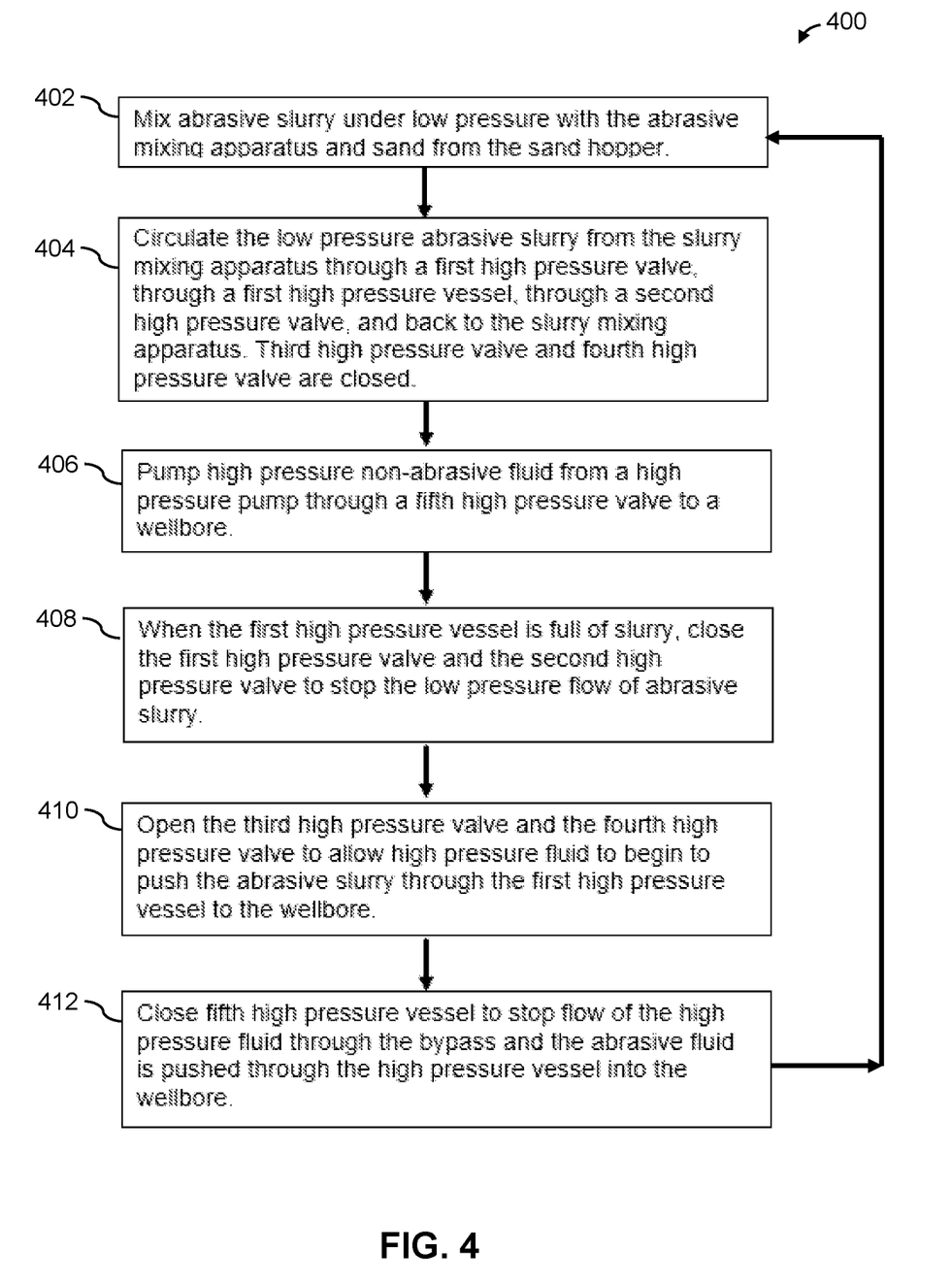
FIG. 4 is a diagram showing an example of a process of injecting an abrasive slurry into a wellbore according to aspects of the present disclosure.

Referring now to FIG. 4 is a method 400 of injecting an abrasive fluid. The method 400 can be performed at, by, or with injection system 10. Method 400 may include or correspond to delivering an abrasive fluid to target location 26, such as wellbore.

Method 400 includes mixing an abrasive slurry under low pressure with the abrasive mixing apparatus and sand from a hopper (e.g., 60), at step 402. The mixing may be performed at or by low-pressure pump 52, mixing tank 56, or both. Method 400 can also include circulating the low pressure abrasive slurry from the slurry mixing apparatus (e.g., 52, 56) through a first valve (e.g., 18*a*), through a first high pressure vessel (e.g., 14, 14*a*), through a second high pressure valve (e.g., 18*b*), and back to the slurry mixing apparatus, at step 404. In some aspects, circulating the low pressure abrasive slurry can include closing one or more valves, such as a third valve (e.g., 18*c*) or a fourth valve (e.g., 18*d*).

Method 400 can also include pumping high pressure non-abrasive fluid from high pressure-pump (e.g., 44) through a fifth high pressure valve (e.g., 18*e*) to a wellbore (e.g., 26), at step 406. Some methods can include, when the high pressure vessel (e.g., 14) is full of slurry, closing the first high pressure (e.g., 18*a*) valve and second high pressure valve (e.g., 18*b*) to stop the low pressure flow of abrasive slurry, at step 408. In some configurations, the first high pressure (e.g., 18*a*) valve and second high pressure valve (e.g., 18*b*) close when the amount of slurry is greater than a maximum slurry threshold. Method 400 can further include opening the third high pressure valve (e.g., 18*c*) and fourth high pressure valve (e.g., 18*d*) to allow high pressure fluid to begin to push the abrasive slurry through the first high pressure vessel (e.g., 14) to the wellbore (e.g., 26), at step 410. In some configurations, method 400 includes closing the fifth high pressure valve to stop flow of the high pressure fluid through the bypass line (e.g., 64), at step 412. In some methods, data can be collected from the injection system to determine operation of the system. For example, a controller can calculate a slurry emptying rate and monitors the high pressure vessel (e.g., 14) until it is emptied of slurry and contains only clear fluid (e.g., from reservoir 48). Once empty of slurry, method 400 can include opening the fifth high pressure vessel (e.g., 18*e*) to allow flow of the high pressure fluid through the bypass line (e.g., 64), closing the third and fourth high pressure valves (e.g., 18*c*, 18*d*) to stop high pressure fluid from flowing through the high pressure vessel (e.g., 14), and opening the first and second high pressure valves (e.g., 18*a*, 18*b*) to allow the low pressure abrasive slurry to circulate through a first high pressure vessel, at step 402.

In some configurations, the injection system switches the valves to push the slurry to the wellbore when the amount of slurry is greater than a maximum slurry threshold. Additionally, or alternatively, the injection system can switch the valves to circulate the low pressure abrasive slurry when the amount of slurry is less than the minimum slurry threshold. In some configurations, the injection system switches between the first operating cycle and the second operating cycle independent of a time period.

The above specification and examples provide a complete description of the structure and use of illustrative configurations. Although certain configurations have been described above with a certain degree of particularity, or with reference to one or more individual configurations, those skilled in the art could make numerous alterations to the disclosed configurations without departing from the scope of this invention. As such, the various illustrative configurations of the methods and systems are not intended to be limited to the particular forms disclosed. Rather, they include all modifications and alternatives falling within the scope of the claims, and configurations other than the one shown may include some or all of the features of the depicted configurations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one configuration or may relate to several configurations. Accordingly, no single implementation described herein should be construed as limiting and implementations of the disclosure may be suitably combined without departing from the teachings of the disclosure.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An injection system comprising:
   a first vessel configured to receive a fluid from a high-pressure pump;
   a plurality of valves, each valve operable between a closed state and an open state:
   a second vessel configured to:
      receive fluid from the first vessel;
      deliver slurry to the first vessel; and
   a controller in communication with the plurality of valves and configured to actuate the plurality of valves between:
      a first state, in which the slurry is delivered to the first vessel; and
      a second state in which the slurry is delivered from the first vessel to a target location;
      determine an amount of slurry within the first vessel;
      actuate the plurality of valves from the second state to the first state when the amount of slurry is less than a first threshold; and
      actuate the plurality of valves from the first state to the second state when the amount of slurry is greater than a second threshold;
   wherein:
      the second vessel is configured to receive particulate solids from a hopper and mix the fluid and the particulate solids to form the slurry; the second vessel is in fluid communication with the first vessel while the plurality of valves is in the first state;
      the second vessel is not in fluid communication with the first vessel while the plurality of valves is in the second state; and
      the controller is configured to switch the valves from the first state to the second state based on a flow rate of the slurry from the second vessel to the first vessel.

2. The system of claim 1, further comprising
   an ultrasonic transducer coupled to the first vessel and in communication with the controller; and
   the controller is configured to:
      determine the amount of slurry within the first vessel based on a first input from the ultrasonic transducer; and
      control an output of the slurry from the first vessel such that a density of the slurry is maintained as the slurry is delivered from the first vessel.

3. The system of claim 1, wherein the controller is configured to:
   actuate the valves between the first state and the second state, independent of a time period, to provide the slurry to a wellbore at a target density;
   determine an output fluid density from the first vessel to the wellbore, and operate the valves between the first and second states to maintain the output fluid density at the target density;
   actuate the valves between the first state and the second state, such that non-abrasive fluid is not delivered from the first vessel to the wellbore; or
   a combination thereof.

4. The system of claim 1, further comprising a bypass line configured to deliver fluid from the high-pressure pump to a wellbore without passing through the first vessel or the second vessel.

5. The system of claim 1, further comprising:
   a low-pressure pump configured to deliver slurry from the second vessel to the first vessel via a first inlet of the first vessel; and
   the high-pressure pump configured to deliver non-abrasive fluid to the first vessel via a second inlet of the first vessel.

6. The system of claim 5, wherein:
   the high-pressure pump is in fluid communication with the first vessel while the plurality of valves are in the second state; and
   the high-pressure pump is not in fluid communication with the first vessel while the plurality of valves are in the first state.

7. The system of claim 1, wherein the first vessel comprises:
   a first outlet configured to deliver fluid from the first vessel to the second vessel; and
   a second outlet configured to deliver fluid from the first vessel to a wellbore.

8. The system of claim 7, wherein the plurality of valves include:
   a first valve coupled to a first inlet of the first vessel and configured to selectively permit flow from the second vessel to the first vessel;
   a second valve coupled to the first outlet of the first vessel and configured to selectively permit flow from the first vessel to the second vessel;
   a third valve coupled to a second inlet of the first vessel and configured to selectively permit flow from the high-pressure pump to the first vessel; and
   a fourth valve coupled to the second outlet of the first vessel and configured to selectively permit flow from the first vessel to the wellbore.

9. The system of claim 8, further comprising:
a bypass line configured to deliver fluid from the high-pressure pump to the wellbore, the bypass line having a bypass valve configured to selectively permit flow from the high-pressure pump to the wellbore;
a first tee fitting coupled to a first port of the first vessel, the first tee fitting including the first inlet and the second inlet of the first vessel; or
a second tee fitting coupled to a second port of the first vessel, the second tee fitting including the first outlet and the second outlet of the first vessel; or
a combination thereof.

10. The system of claim 9, wherein, while the plurality of valves is in the first state:
the first valve, the second valve, and the bypass valve are in the open state;
the third valve and the fourth valve are in the closed state; and
the system defines:
a first flow path from the second vessel, through the first valve, through the first vessel, through the second valve, and to the second vessel, the first flow path being a closed loop flow path; and
a second flow path from the high-pressure pump, through the bypass valve, through the bypass line, and to the wellbore.

11. The system of claim 10, wherein, while the plurality of valves is in the second state:
the first valve, the second valve, and the bypass valve are in the closed state;
the third valve and the fourth valve are in the open state; and
the system defines a third flow path from the high-pressure pump, through the third valve, through the first vessel, through the fourth valve, and to the wellbore; and
wherein, when the slurry is delivered to the wellbore via a portion of the third flow path, the particulate solids and the fluid of the slurry have a velocity that is within 15% of one another.

12. The system of claim 8, further comprising:
a third vessel having:
a first inlet configured to receive fluid from the high-pressure pump;
a second inlet configured to receive slurry from the second vessel;
a first outlet configured to deliver fluid from the third vessel to the wellbore; and
a second outlet configured to deliver fluid from the third vessel to the second vessel; and
wherein:
slurry is delivered from the third vessel to the wellbore when the plurality of valves is in the first state; and
slurry is delivered from the second vessel to the third vessel when the plurality of valves is in the second state.

13. The system of claim 12, wherein the plurality of valves include:
a fifth valve coupled to the first inlet of the third vessel and configured to selectively permit flow from the high-pressure pump to the third vessel;
a sixth valve coupled to the first outlet of the third vessel and configured to selectively permit flow from the third vessel to the wellbore;
a seventh valve coupled to the second inlet of the third vessel and configured to selectively permit flow from the second vessel to the third vessel; and
an eighth valve coupled to the second outlet of the third vessel and configured to selectively permit flow from the third vessel to the second vessel.

14. The system of claim 13, wherein, while the plurality of valves are in the first state:
the first valve, the second valve, the fifth valve, and the sixth valve are in the open state; and
the third valve, the fourth valve, the seventh valve, and the eighth valve are in the closed state.

15. A method for injecting an abrasive fluid, the method comprising:
operating an injection system, the injection system configured to operate in:
a first operating cycle comprising:
delivering a slurry to a first vessel at a first pressure below a pressure threshold at a first time; and
delivering a non-abrasive fluid from a high-pressure pump to a foundation at a second pressure above the pressure threshold at the first time; and
a second operating cycle comprising delivering the slurry from the first vessel to the foundation at a third pressure above the pressure threshold;
comparing an amount of slurry in the first vessel to a maximum slurry threshold; and
operating the injection system in the second operating cycle when the amount of slurry is greater than the maximum slurry threshold.

16. The method of claim 15, further comprising:
mixing particulate solids with a fluid to form the slurry;
comparing the amount of slurry in the first vessel to a minimum slurry threshold; and
operating the injection system in the first operating cycle when the amount of slurry is less than the minimum slurry threshold.

17. The method of claim 16, wherein:
comparing the amount of slurry includes determining, via an ultrasonic transducer, the amount of slurry in the first vessel; or
the injection system is switches between the first operating cycle and the second operating cycle independent of a time period.

18. The method of claim 16, wherein:
the injection system switches from the first operating cycle to the second operating cycle when the amount of slurry is greater than the maximum slurry threshold; and
the injection system switches from the second operating cycle to the first operating cycle when the amount of slurry is less than the minimum slurry threshold.

19. An injection system comprising:
a first vessel configured to receive a fluid from a high-pressure pump;
a plurality of valves, each valve operable between a closed state and an open state:
an ultrasonic transducer coupled to the first vessel; and
a controller in communication with the plurality of valves and the ultrasonic transducer, the controller configured to
actuate the plurality of valves between:
a first state, in which a slurry is delivered to the first vessel; and
a second state in which the slurry is delivered from the first vessel to a target location;
determine an amount of slurry within the first vessel based on a first input associated with detection of fluid characteristics within the first vessel via the ultrasonic transducer;

control an output of the slurry from the first vessel such that a density of the slurry is maintained as the slurry is delivered from the first vessel;

actuate the plurality of valves from the second state to the first state when the amount of slurry is less than a first threshold; and actuate the plurality of valves from the first state to the second state when the amount of slurry is greater than a second threshold.

20. The injection system of claim 19, wherein the first input is associated with a signal from the ultrasonic transducer being below a signal threshold.

* * * * *